US010308243B2

(12) United States Patent
Lavoie (10) Patent No.: US 10,308,243 B2
(45) Date of Patent: Jun. 4, 2019

(54) VEHICLE REMOTE PARK ASSIST WITH OCCUPANT DETECTION (71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 15/220,083

(22) Filed: Jul. 26, 2016

(65) Prior Publication Data
US 2018/0029591 A1 Feb. 1, 2018

(51) Int. Cl.
G05D 1/00 (2006.01)
G05D 3/00 (2006.01)
G06F 7/00 (2006.01)
G06F 17/00 (2019.01)
B60W 30/06 (2006.01)
B60W 50/14 (2012.01)
G06N 7/00 (2006.01)
B62D 15/02 (2006.01)

(52) U.S. Cl.
CPC ............ *B60W 30/06* (2013.01); *B60W 50/14* (2013.01); *B62D 15/027* (2013.01); *B62D 15/0285* (2013.01); *G06N 7/005* (2013.01); *B60W 2050/143* (2013.01); *B60W 2420/42* (2013.01); *B60W 2420/52* (2013.01); *B60W 2420/54* (2013.01); *B60W 2750/308* (2013.01)

(58) Field of Classification Search
None
See application file for complete search history.

(56) References Cited

U.S. PATENT DOCUMENTS 6,724,322 B2 4/2004 Tang
6,768,420 B2 7/2004 McCarthy et al.
6,997,048 B2 2/2006 Komatsu et al.
(Continued)

FOREIGN PATENT DOCUMENTS

CN 101929921 A 12/2010
CN 103049159 B 7/2015
(Continued)

OTHER PUBLICATIONS

Daimler AG, *Remote Parking Pilot*, Mar. 2016 (3 Pages).
(Continued)

*Primary Examiner* — Anne M Antonucci
*Assistant Examiner* — Kenny A. Taveras
(74) *Attorney, Agent, or Firm* — Frank Lollo; Neal, Gerber & Eisenberg LLP; James P. Muraff (57) ABSTRACT Systems and methods are disclosed for vehicle remote park assist with occupant detection. An example disclosed vehicle includes range detection sensors and a remote parking unit. The example range detection sensors determine whether a target parking space is narrow. The example remote parking unit, in response to a request from a mobile device external to the vehicle, when the target parking space is narrow, scans, with occupant detection sensors, the interior of the vehicle. Additionally, the example remote parking unit, in response to detecting an occupant in the vehicle, sends a first notification to the mobile device.

21 Claims, 4 Drawing Sheets

(56) References Cited

U.S. PATENT DOCUMENTS

| | | |
|---|---|---|
| 7,813,844 B2 | 10/2010 | Gensler |
| 8,098,146 B2 | 1/2012 | Petrucelli et al. |
| 8,692,773 B2 | 4/2014 | You |
| 9,014,920 B1 * | 4/2015 | Torres ................ G08B 21/0202 |
| | | 701/45 |
| 9,302,675 B2 | 4/2016 | Schilling |
| 9,318,022 B2 | 4/2016 | Barth |
| 9,842,444 B2 | 12/2017 | Van Wiemeersch |
| 9,845,070 B2 | 12/2017 | Petel |
| 9,846,431 B2 | 12/2017 | Petel |
| 9,921,743 B2 | 3/2018 | Bryant |
| 9,946,255 B2 | 4/2018 | Matters |
| 9,975,504 B2 | 5/2018 | Dalke |
| 10,131,347 B2 | 11/2018 | Kim |
| 2003/0098792 A1 | 5/2003 | Edwards et al. |
| 2006/0010961 A1 | 1/2006 | Gibson et al. |
| 2006/0227010 A1 | 10/2006 | Berstis |
| 2009/0125181 A1 | 5/2009 | Luke |
| 2009/0128315 A1 | 5/2009 | Griesser |
| 2009/0146813 A1 | 6/2009 | Nuno |
| 2009/0174574 A1 | 7/2009 | Endo et al. |
| 2012/0007741 A1 | 1/2012 | Laffey, Sr. et al. |
| 2013/0043989 A1 | 2/2013 | Niemz |
| 2013/0124061 A1 | 5/2013 | Khanafer |
| 2014/0222252 A1 * | 8/2014 | Matters ................ B62D 15/027 |
| | | 701/2 |
| 2015/0163649 A1 | 6/2015 | Chen |
| 2015/0220791 A1 | 8/2015 | Wu |
| 2015/0329110 A1 | 11/2015 | Stefan |
| 2016/0114726 A1 | 4/2016 | Nagata |
| 2017/0076603 A1 | 3/2017 | Bostick |
| 2017/0192428 A1 | 7/2017 | Vogt |
| 2017/0301241 A1 | 10/2017 | Urhahne |
| 2017/0308075 A1 | 10/2017 | Whitaker |
| 2018/0029591 A1 | 2/2018 | Lavoie |
| 2018/0039264 A1 | 2/2018 | Messner |
| 2018/0043884 A1 | 2/2018 | Johnson |
| 2018/0056939 A1 | 3/2018 | van Roermund |
| 2018/0194344 A1 | 7/2018 | Wang |
| 2018/0236957 A1 | 8/2018 | Min |

FOREIGN PATENT DOCUMENTS

| | | | |
|---|---|---|---|
| CN | 105513412 A | 4/2016 | |
| CN | 106598630 A | 4/2017 | |
| CN | 104290751 B | 1/2018 | |
| DE | 19817142 A1 | 10/1999 | |
| DE | 19821163 A1 | 11/1999 | |
| DE | 102012200725 A1 * | 7/2013 | ........... B62D 15/027 |
| DE | 102012200725 A1 | 7/2013 | |
| DE | 102014009077 A1 | 2/2015 | |
| DE | 102016125282 A1 | 7/2017 | |
| GB | 2517835 A | 3/2015 | |
| JP | 2000293797 A | 10/2000 | |
| JP | 5586450 B2 | 9/2014 | |
| WO | WO 2013/123181 A1 | 8/2013 | |
| WO | WO 2016/128200 A1 | 8/2016 | |
| WO | WO 2016/134822 A1 | 9/2016 | |
| WO | WO 2017/096307 A1 | 6/2017 | |
| WO | WO 2017/096728 A1 | 6/2017 | |
| WO | WO 2017/097942 A1 | 6/2017 | |

OTHER PUBLICATIONS

Search Report dated Jan. 19, 2018 for GB Patent Application No. 1711988.4 (3 pages).
Tesla Model S Owner's Manual v2018.44. Oct. 29, 2018.
Search Report dated Oct. 10, 2018 for GB Patent Application No. 1806499.8 (4 pages).

* cited by examiner

VEHICLE REMOTE PARK ASSIST WITH OCCUPANT DETECTION

TECHNICAL FIELD

The present disclosure generally relates to semi-autonomous vehicles and, more specifically, vehicle remote park assist with occupant detection.

BACKGROUND

A semi-autonomous vehicle is a vehicle that is normally operated by a driver, but certain specialized functions are autonomous. For example, some vehicles have adaptive cruise control or autopilot that facilitates, in certain circumstances, the vehicle controlling its speed and following distance independent of driver controlling input. Increasingly, vehicles are equipped with parking assist functions that will park the vehicle. When activated remotely, parking assist systems facilitate parking vehicles in narrow spaces.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle remote park assist with occupant detection. An example disclosed vehicle includes range detection sensors and a remote parking unit. The example range detection sensors determine whether a target parking space is narrow. The example remote parking unit, in response to a request from a mobile device external to the vehicle, when the target parking space is narrow, scans, with occupant detection sensors, the interior of the vehicle. Additionally, the example remote parking unit, in response to detecting an occupant in the vehicle, sends a first notification to the mobile device.

An example disclosed method to remotely park a vehicle includes determining, with range detection sensors, whether a target parking space is narrow. The example method also includes, in response to a request from a mobile device external to the vehicle when the target parking space is narrow, scanning, with occupant detection sensors, the interior of the vehicle, and in response to detecting an occupant in the vehicle, sending, via a processor, a first notification to the mobile device.

An example disclosed tangible computer readable medium comprises instruction that, when executed, cause a vehicle to determine, with range detection sensors, whether a target parking space is narrow. Additionally, the example instructions, when executed, cause the vehicle to, in response to a request from a mobile device external to the vehicle, when the target parking space is narrow, scan, with occupant detection sensors, the interior of the vehicle, and in response to detecting an occupant in the vehicle, send a first notification to the mobile device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Remote park assist systems facilitate a customer exiting the vehicle before the remote park assist system autonomously parks the vehicle. The driver activates the remote park assist system using a button on a key and/or an interface on an authorized mobile device (e.g., a smart phone, a smart watch, a tablet, etc.). In such a manner, a vehicle may be parked in a narrow space in which the doors of the vehicle cannot be opened. This facilitates parking vehicles more densely in a space saving manner. However, if the vehicle is parked while an occupant or an object of interest (e.g., a purse, a wallet, a mobile device, etc.) is in the vehicle, traditionally, the remote park assist system needs reverse to a point where the door can be opened.

As disclosed herein below, a vehicle includes a remote parking unit to autonomously park the vehicle. The remote parking unit is communicatively coupled, via one or more vehicle data buses, to other electronic control units (ECUs) that control the motive functions of the vehicle. For example, the ECUs may include a transmission control unit, a throttle control unit, and a brake control, etc. The remote parking unit is also communicatively coupled to range detection sensors to detect objects in the proximity of the vehicle and the location, size and shape of the parking spot. Additionally, the remote parking unit includes an occupant detector. As used herein, an occupant is defined to include (i) humans and animals, and (ii) objects configured to be detected (e.g., a purse, a wallet, a mobile device, a stroller, a child seat, etc.). The occupant detector monitors the interior of the vehicle for occupants. When the remote parking unit is activated, the occupant detector determines whether an occupant is inside the vehicle. If an occupant is not detected, the occupant detector sends a message to the key fob or the mobile device to remind the driver the vehicle is about to be parked into a narrow space. If an occupant is detected, the remote parking unit (a) instructs the transmission control unit to shift the transmission into park, and (b) sends a message to the key fob or the mobile device to notify the driver that the occupant is in the vehicle. In some examples, the occupant detector, based on data from the range detection and navigation data, determines whether the parking space is currently narrow or projected become a narrow parking space in the future. As used herein a narrow parking space is a parking space in which the vehicle, with its doors closed, is able to fit, but the doors cannot be open to facilitate the entrance or exit of the driver or an occupant. For example, if the parking lot in which the vehicle is being parked is designed to have narrow parking spots, the occupant detector may act as if the parking spot is a narrow parking spot even if one or more of the adjacent parking spaces are currently empty.

Figure 1:
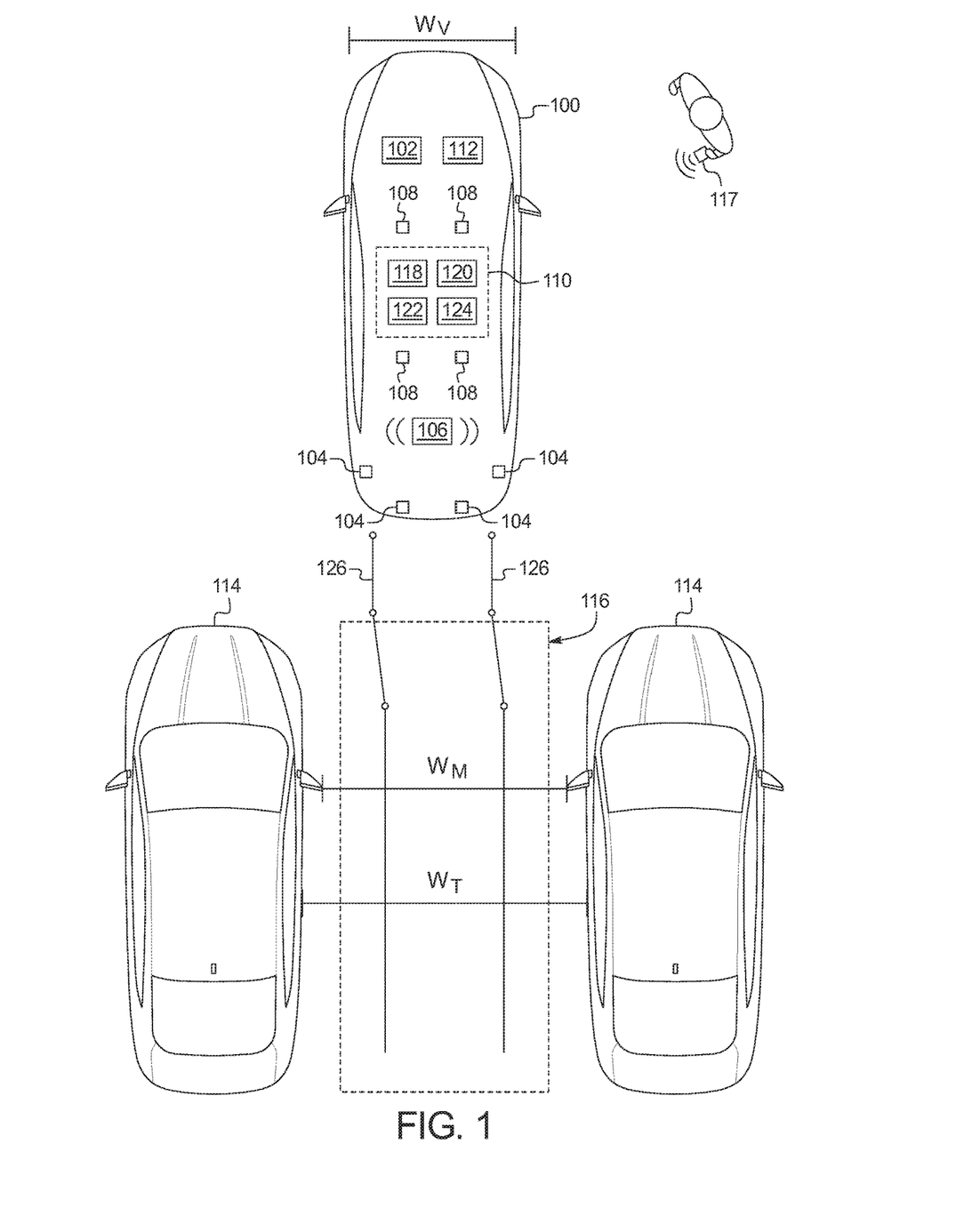
FIG. 1 illustrates a vehicle operating in accordance with the teachings of this disclosure.

FIG. 1 illustrates an assisted vehicle 100 operating in accordance with the teachings of this disclosure. As used herein, an assisted vehicle 100 is a vehicle that includes a remote parking unit 102 that controls the motive functions of the vehicle to park the vehicle without a driver occupying the vehicle. The assisted vehicle 100 may be a standard gasoline powered vehicle, a hybrid vehicle, an electric vehicle, a fuel cell vehicle, and/or any other mobility implement type of vehicle. The assisted vehicle 100 includes parts related to mobility, such as a powertrain with an engine, a transmission, a suspension, a driveshaft, and/or wheels, etc. Additionally, the assisted vehicle 100 may be semi-autonomous or autonomous. A semi-autonomous vehicle is a vehicle that autonomously controls some routine motive functions (e.g., assisted parking, remote assisted parking, adaptive cruise control, etc.) while the driver controls the vehicle. An autonomous vehicle is a vehicle that autonomously controls the motive functions of the vehicle without direct user steering input. In the illustrated example, the assisted vehicle 100 includes range detection sensors 104, a wireless network node 106, occupant detection sensors 108, electronic control units (ECUs) 110, and the remote parking unit 102. In some examples, the assisted vehicle 100 includes an on-board communications platform 112.

The range detection sensors 104 sense objects, such as parked vehicle 114, and characterize spaces, such a parking space 116, in the vicinity of the assisted vehicle 100. The range detection sensors 104 include ultrasonic sensors, cameras, infrared sensors, RADAR, and/or LiDAR, etc. In the illustrated example, the range detection sensors 104 are embedded in the bumper of the assisted vehicle 100 to detect the parked vehicles 114 and characterized the parking space 116 for the remote parking unit 102. Alternatively, the range detection sensors 104 may be positioned in other locations (e.g., on the roof of the assisted vehicle 100, etc.) to facilitate detecting the parked vehicles 114 and characterized the parking space 116. In the illustrated example, the range detection sensors 104 determine a mirror width ($W_M$) (e.g., the width between the side view mirrors of the parked vehicles 114) and a total width ($W_T$) (e.g. the width between the parked vehicles 114 at the point that a vehicle parked between them would open its doors).

The wireless network node 106 connects to a mobile device 117 (e.g., a smart phone, a smart watch, a tablet computer, etc.) of the driver of the assisted vehicle 100. In some examples, the wireless network node 106 is configured in accordance with Bluetooth Low Energy (BLE) as specified in the Bluetooth Specification 4.0 (as revised) maintained by the Bluetooth Special Interest Group. Alternatively, in some examples, the wireless network node 106 may operate in accordance with other local area or personal area network standards, such as Bluetooth, IEEE 802.11 or IEEE 802.15.4. When connected to the mobile device 117, the wireless network node 106 facilitates input by a user to the remote parking unit 102 (e.g., activating the remote parking system, etc.). Additionally, the remote parking unit 102 may send notifications to the mobile device 117 via the wireless network node 106.

The occupant detection sensors 108 detect occupants inside the assisted vehicle 100. In some examples, the occupant detection sensors 108 detect indicators of the presences of the occupants (e.g., biometric sensors, weight sensors, interior ultrasonic sensors, cameras, heartbeat sensors, etc.). Additionally, in some examples, the occupant detection sensors 108 detect tags associated with the occupants (e.g., radio-frequency identification (RFID) readers, BLE nodes, etc.). The tags are active or passive devices configured to attach to objects (e.g., purses, wallets, car seats, baby carriers, etc.) that respond when interrogated by the corresponding occupant detection sensor 108. For example, the tag may be a passive RFID circuit that responds when interrogated by an RFID reader. The occupant detection sensors 108, from time to time (e.g., periodically, aperiodically, etc.) activate their various functions (sometimes referred to as "scanning") to detect occupants inside the cabin of the assisted vehicle 100.

The ECUs 110 monitor and control subsystems of the assisted vehicle 100. The ECUs 110 communicate and exchange information via the a vehicle data bus (e.g., the vehicle data bus 202 of FIG. 2 below). Additionally, the ECU(s) 110 may communicate properties (such as, status of the ECU 110, sensor readings, control state, error and diagnostic codes, etc.) to and receive instructions from other devices (e.g., the remote parking unit 102, etc.) Some assisted vehicles 100 may have seventy or more ECUs 110 located in various locations around the assisted vehicle 100 communicatively coupled by the vehicle data bus. The ECUs 110 are discrete sets of electronics that include their own circuit(s) (such as integrated circuits, microprocessors, memory, storage, etc.) and firmware, sensors, actuators, and/or mounting hardware. In the illustrated example, the ECUs 110 include a steering control unit 118, a brake control unit 120, a throttle control unit 122, and a transmission control unit 124. The steering control unit 118 includes actuators to control the steering (e.g., the angle of the wheels) of the assisted vehicle 100 without driver input. The brake control unit 120 includes actuators to operate the brakes of the assisted vehicle 100 without driver input. Additionally, the throttle control unit 122 controls is capable of adjust the throttle position of the assisted vehicle 100 without driver input. The transmission control unit 124 facilitates changed the transmission setting of the assisted vehicle 100 without driver input.

The on-board communications platform 112 includes wired or wireless network interfaces to enable communication with external networks. The on-board communications platform 112 also includes hardware (e.g., processors, memory, storage, antenna, etc.) and software to control the wired or wireless network interfaces. The on-board communications platform 112 may include controllers for Bluetooth® and/or other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). The on-board communications platform 112 may also include a global positioning system (GPS) receiver. Further, the external network(s) may be a public network, such as the Internet; a private network, such as an intranet; or combinations thereof, and may utilize a variety of networking protocols now available or later developed including, but not limited to, TCP/IP-based networking protocols.

The remote parking unit 102 parts the assisted vehicle 100 into the parking space 116 in response to a request from a user (e.g., via the mobile device 117 communicatively coupled to the wireless network node 106). The remote parking unit 102 facilitates parking the assisted vehicle 100 into a narrow parking space (e.g., the parking space 116) without the driver in the assisted vehicle 100. For example, the driver may park the assisted vehicle 100 near the target parking space 116, exit the assisted vehicle 100, and engage the remote parking assist system. In such an example, the remote parking unit 102 may maneuver the assisted vehicle 100 into the parking space 116 by controlling the ECUs 110. Additionally, the remote parking unit 102 facilitates the assisted vehicle 100 exiting the parking space 116 without the driver in the assisted vehicle 100.

The remote parking unit 102, via the range detection sensors 104, locates the parked vehicle(s) 112 and characterizes the spatial dimensions of the parking space 116. Based on the mirror width ($W_M$), the total width ($W_T$) and a vehicle width ($W_V$) of the assisted vehicle 100, the remote parking unit 102 determines whether the assisted vehicle 100 will fit into the parking space 116. If the assisted vehicle 100 will fit into the parking space 116, the remote parking unit 102 calculates a path 126 to maneuver the assisted vehicle 100 into the parking space 116. If the assisted vehicle 100 will fit into the parking space 116, the remote parking unit 102 notifies the driver (e.g., via the mobile device 117).

Additionally, the remote parking unit 102, via the occupant detection sensors 108, monitors the cabin of the assisted vehicle 100 to determine whether occupants are inside the assisted vehicle 100. In some examples, the occupant detection sensors 108 detect indicia of the occupant(s), such as a heartbeat, weight on one of the seats, camera object recognition, movement, etc. In some examples, the occupant detection sensors 108 detect the tags affixed to objects in the cabin. If an occupant is detected when the driver activates the remote parking system, the remote parking unit 102, via the transmission control unit 124, shifts the transmission of the assisted vehicle 100 into park and sends a notification, via the wireless network node 106, to the driver that an occupant was detected in the assisted vehicle 100.

In some examples, the remote parking unit 102 determines whether the parking space 116 will become a narrow parking space. For example, if only one parked vehicle 114 is currently adjacent to the parking space 116, the parking space 116 may become a narrow parking space when another parked vehicle 114 parks adjacent to the parking space 116. In some such examples, the remote parking unit 102 connects, via the on-board communications platform 112, to a server on an external network (e.g., the Internet) to determine whether the parking space 116 is a known narrow parking space. For example, a navigation data provider (e.g., Google®, MapQuest®, Waze®, etc.) may supply data on whether the current location of the assisted vehicle 100 (e.g., supplied by the GPS receiver of the on-board communications platform 112) is a location with narrow parking spaces. Additionally or alternatively, in some examples, the remote parking unit 102 analyzes other vehicle park in the vicinity and/or analyzes (e.g., when the range detection sensors 104 include external cameras) width of the marking delineating the parking space 116. In some such examples, if the parking space 116 may become a narrow parking space, the remote parking unit 102 acts as if it is currently a narrow parking space.

Figure 2:
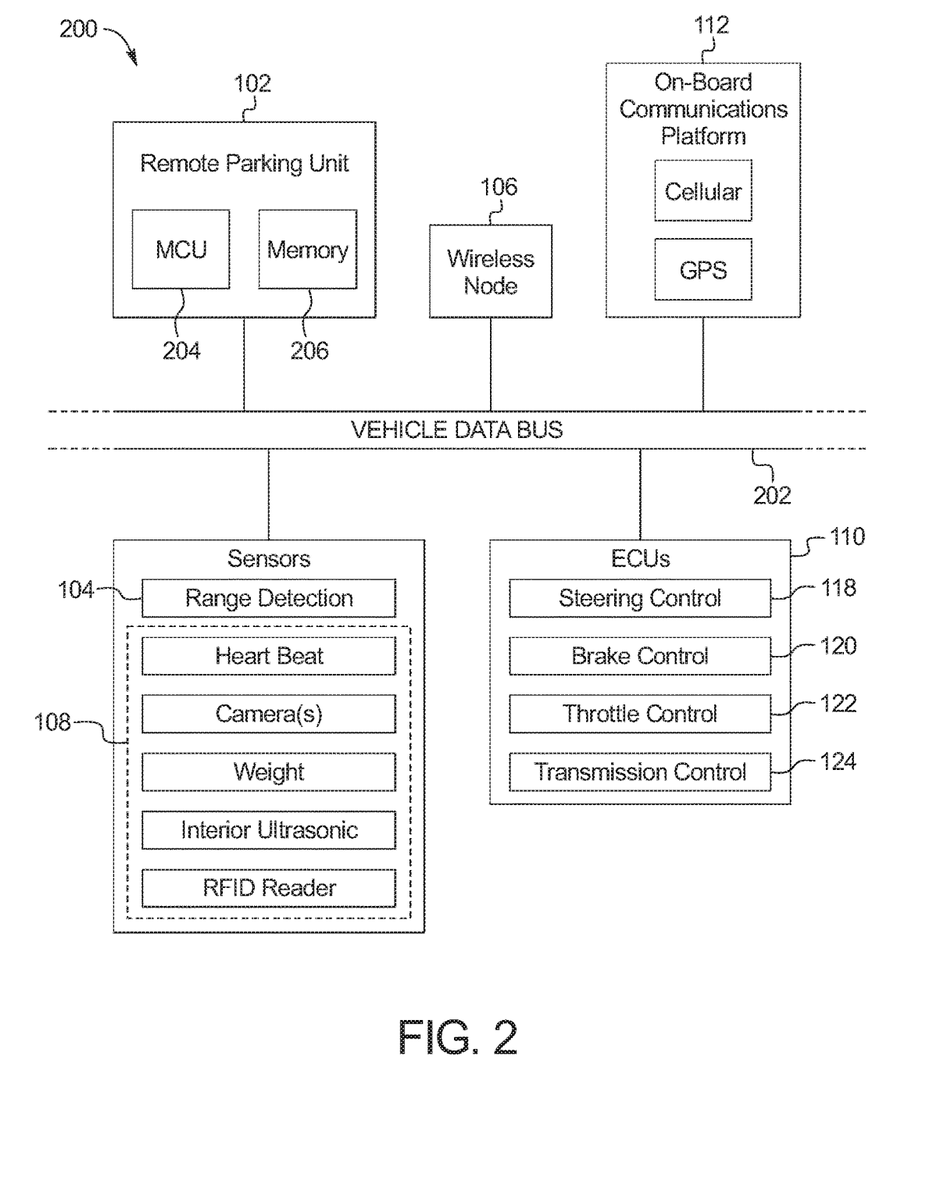
FIG. 2 is a block diagram of electronic components of the vehicle of FIG. 1.

FIG. 2 is a block diagram of electronic components 200 of the assisted vehicle 100 of FIG. 1. In the illustrated example, the electronic components 200 include the remote parking unit 102, the on-board communications platform 112, the sensors 104 and 108, the wireless network node 106, the ECUs 110, and a vehicle data bus 202.

The remote parking unit 102 includes a processor or controller 204, and memory 206. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The vehicle data bus 202 communicatively couples the remote parking unit 102, the on-board communications platform 112, the sensors 104 and 108, the wireless network node 106, and the ECUs 110. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7), a K-line bus protocol (ISO 9141 and ISO 14230-1), and/or an Ethernet™ bus protocol IEEE 802.3 (2002 onwards), etc. In some examples, the ECUs 110 and sensors 104 and 108 are organized on separate data buses to manage, for example, safety, data congestion, data management, etc. For example, the sensitive ECUs 110 (e.g., the brake control unit 120, the throttle control unit 122, etc.) may be on a separate bus from the other ECUs 110 and sensors 104 and 108.

Figure 3:
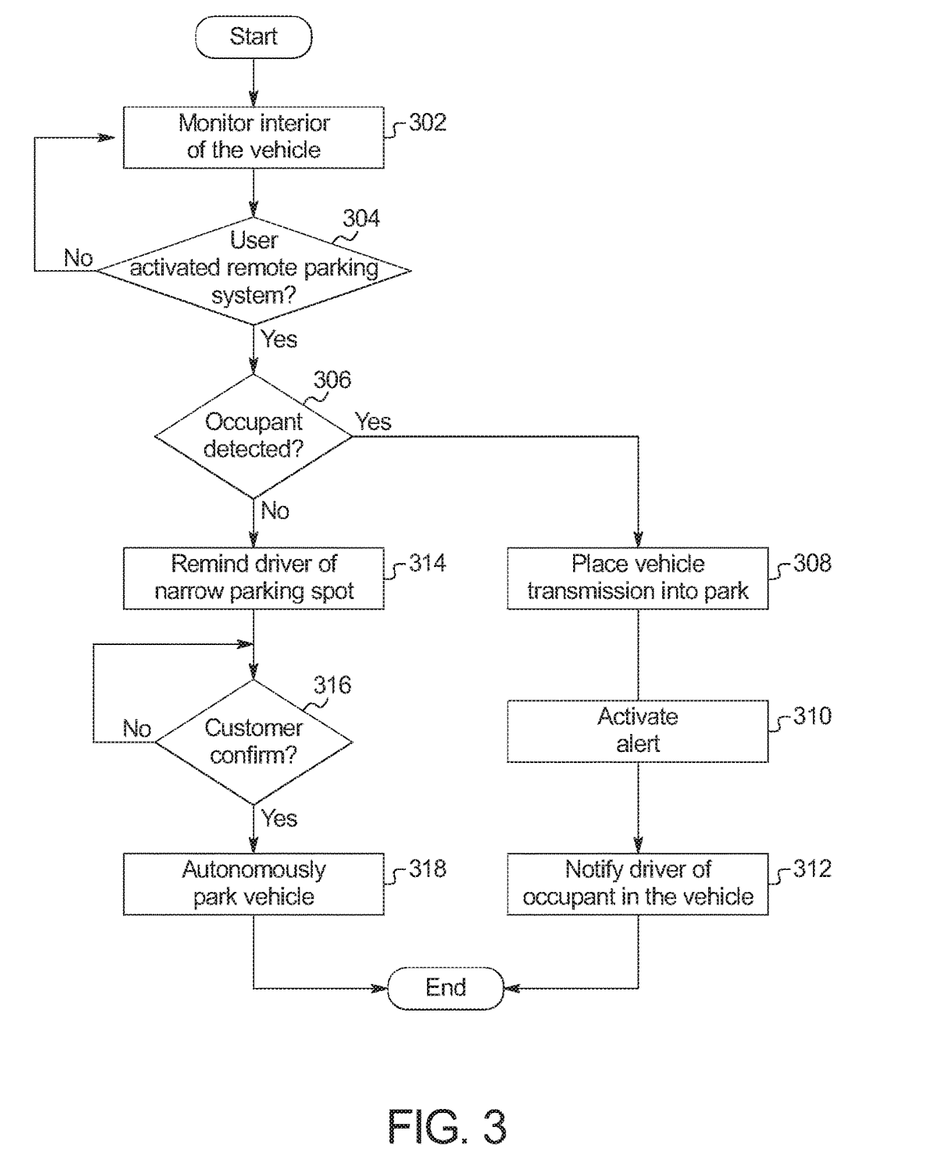
FIG. 3 is a flow diagram of a method to perform remote assisted parking that may be implemented by the electronic components of FIG. 2.

FIG. 3 is a flow diagram of a method to perform remote assisted parking that may be implemented by the electronic components 200 of FIG. 2. Initially, at block 302, the remote parking unit 102 monitors the interior of the assisted vehicle 100 for occupants. At block 304, the remote parking unit 102 waits until the driver activates the remote parking system. In response to the driver activating the remote parking system, at block 306, the remote parking unit 102 determines whether the occupant detection sensors 108 detect an occupant in the interior of the assisted vehicle 100. For example, the occupant detection sensors 108 may detect a tag affixed to a purse in the cabin of the assisted vehicle 100. If the occupant detection sensors 108 detect an occupant in the interior of the assisted vehicle 100, the method continues at block 308. Otherwise, if the occupant detection sensors 108 do not detect an occupant in the interior of the assisted vehicle 100, the method continues at block 314.

At block 308, the remote parking unit 102 instructs the transmission control unit 124 to shift the transmission of the assisted vehicle 100 into park. At block 310, the remote parking unit 102 instructs the assisted vehicle 100 (e.g., via a body control unit) to alert the driver (e.g., activate hazard lights, activate a horn with a short burst pattern, flash lights of the vehicle, etc.). At block 312, the remote parking unit 102, via the wireless network node 106, sends a notification to the mobile device 117 of the driver to inform them of the detected occupant. In some examples, the notification causes the mobile device 117 to display a text or picture warning, vibrate, and/or produce an audio warning, etc. In some examples, if an identifier is associated with the occupant (e.g., an identifier of an RFID tag associated with the occupant), the notification includes the identifier.

At block 314, the remote parking unit 102, via the wireless network node 106, sends a notification to the mobile device 117 of the driver to (i) remind the driver that the of the narrow parking spot and (ii) prompt a confirmation process on the mobile device 117. For example, the notification may cause the mobile device 117 to display, "Warning: there is not enough room to open vehicle doors when parked in this space." At block 316, the remote parking unit 102 waits until a confirmation is received from the mobile device 117 of the driver. At block 318, the remote parking unit 102 parks the assisted vehicle 100 in the parking space 116.

Figure 4:
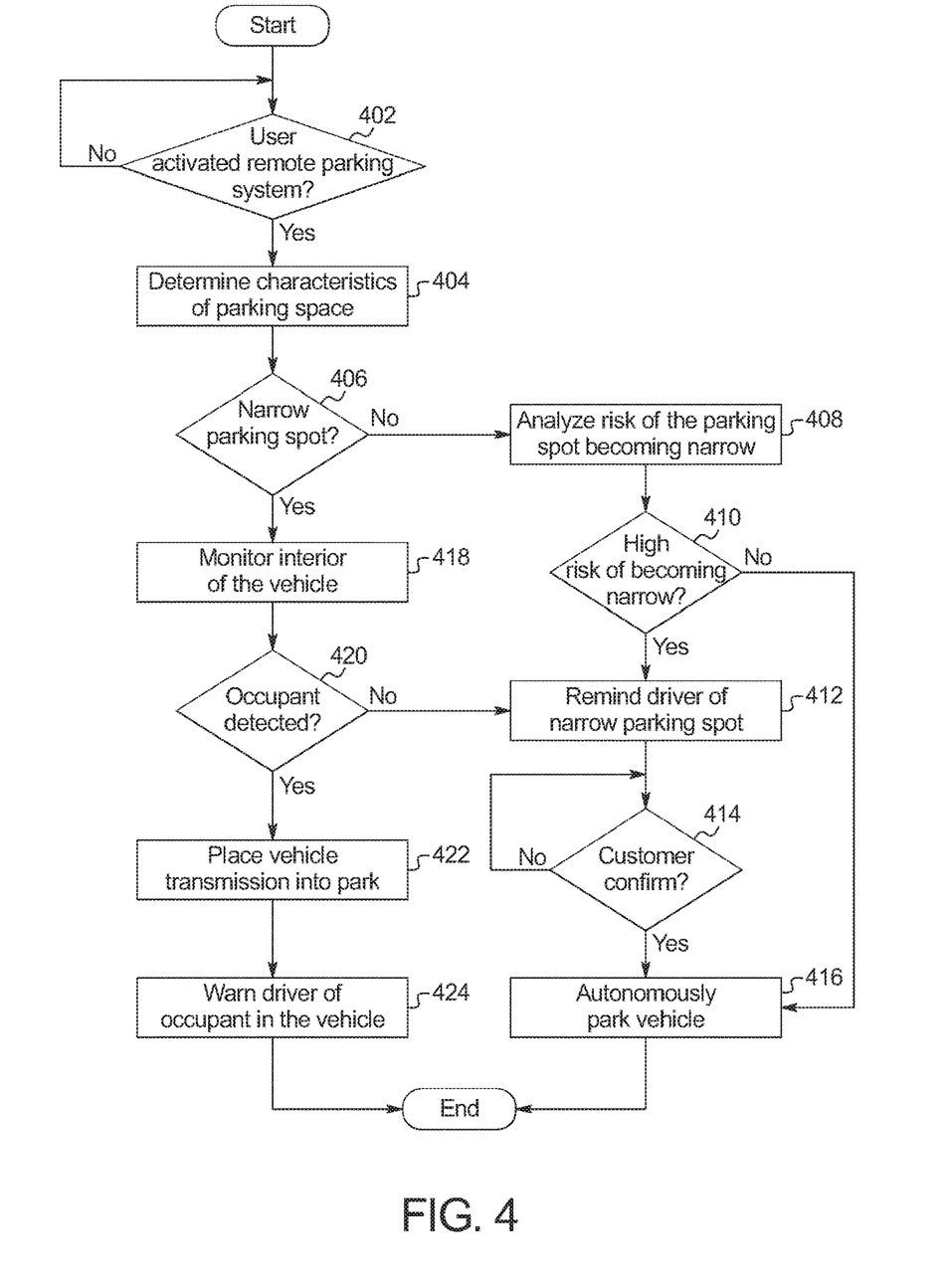
FIG. 4 is a flow diagram of another method to perform remote assisted parking that may be implemented by the electronic components of FIG. 2.

FIG. 4 is a flow diagram of another method to perform remote assisted parking that may be implemented by the electronic components 200 of FIG. 2. Initially, at block 402, the remote parking unit 102 waits until the driver activates the remote parking system. At block 404, the remote parking unit 102 determines, via the range detection sensors 104, the dimensions of the parking space 116. For example, the remote parking unit 102 determines the mirror width ($W_M$) and the total width ($W_T$) of the parking space 116. At block 406, the remote parking unit 102 determines whether the parking space 116 is a narrow parking space. If the parking space 116 is not a narrow parking space, the method continues at block 408. Otherwise, if the parking space 116 is a narrow parking space, the method continues at block 418.

At block 408, the remote parking unit 102 analyzes whether the parking space 116 will become a narrow parking space. In some examples, the remote parking unit 102 connects, via the on-board communications platform 112, to a server on an external network (e.g., via an application programming interface (API)) to request navigation data indicating whether the parking area in the vicinity of the assisted vehicle 100 is designated as having narrow parking spaces. Alternatively or additionally, in some examples, the remote parking unit 102 analyzes markings in the parking space 116 delineating the boundaries of the parking space 116. At block 410, the remote parking unit 102 determines whether the parking space 116 may become a narrow parking space. If the parking space 116 may become a narrow parking space, the method continues to block 412. Otherwise, if the parking space 116 will not become a narrow parking space, the method continues to block 416.

At block 412, the remote parking unit 102, via the wireless network node 106, sends a notification to the mobile device 117 of the driver to (i) remind the driver that the of the narrow parking spot and (ii) prompt a confirmation process on the mobile device 117. At block 414, the remote parking unit 102 waits until a confirmation is received from the mobile device 117 of the driver. At block 316, the remote parking unit 102 parks the assisted vehicle 100 in the parking space 116.

At block 418, the remote parking unit 102 scans the interior of the assisted vehicle 100 for occupants. At block 420, the remote parking unit 102 determines whether the occupant detection sensors 108 detect an occupant in the interior of the assisted vehicle 100. For example, the occupant detection sensors 108 may detect a heartbeat with a heartbeat sensor and weight from a weight sensor monitoring the back seat. If the occupant detection sensors 108 detect an occupant in the interior of the assisted vehicle 100, the method continues at block 422. Otherwise, if the occupant detection sensors 108 do not detect an occupant in the interior of the assisted vehicle 100, the method continues at block 412.

At block 422, the remote parking unit 102 instructs the transmission control unit 124 to shift the transmission of the assisted vehicle 100 into park. At block 424, the remote parking unit 102, via the wireless network node 106, sends a notification to the mobile device 117 of the driver to inform them of the detected occupant. In some examples, if an identifier is associated with the occupant (e.g., an identifier of an RFID tag associated with the occupant), the notification includes the identifier.

The flowchart of FIGS. 3 and 4 are a methods that may be implemented by machine readable instructions that comprise one or more programs that, when executed by a processor (such as the processor 204 of FIG. 2), cause the assisted vehicle 100 to implement the remote parking unit 102 of FIG. 1. Further, although the example program(s) is/are described with reference to the flowcharts illustrated in FIGS. 3 and 4, many other methods of implementing the example the remote parking unit 102 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   range detection sensors to determine whether a target parking space is narrow; and
   a remote parking unit to:
   responsive to a request from a mobile device external to the vehicle:
   when the target parking space is narrow:
   scan, with occupant detection sensors, an interior of the vehicle; and
   responsive to detecting no occupants in the vehicle, send, to the mobile device, a first notification indicating that the target parking space is narrow.

2. The vehicle of claim 1, wherein the range detection sensors include at least one of a plurality of ultrasonic sensors, a RADAR, a LiDAR, an infrared sensors, or a camera.

3. The vehicle of claim 1, wherein the occupant detection sensors include at least one of an ultrasonic sensor, a weight sensor, a camera, a heartbeat sensor, or an RFID reader.

4. The vehicle of claim 1, wherein the target parking space is narrow when a width of the target parking space is less than a width of the vehicle with doors of the vehicle open to facilitate entering and exiting the vehicle.

5. The vehicle of claim 1, wherein when the target parking space is not narrow, the remote parking unit is to determine a likelihood that the target parking space will become narrow.

6. The vehicle of claim 5, wherein the remote parking unit is to, when the target parking space is likely to become narrow, scan, the with occupant detection sensors, the interior of the vehicle.

7. The vehicle of claim 5, wherein the remote parking unit is to determine the likelihood at least in part by receiving navigation data from an external server, the navigation data indicating one or more locations with a narrow parking space.

8. The vehicle of claim 5, wherein the remote parking unit is to determine the likelihood at least in part by scanning, via the range detection sensors:
   one or more parking spaces that are similar to the target parking space; and
   one or more objects surrounding the one or more parking spaces.

9. The vehicle of claim 1, wherein the remote parking unit is to, in response to detecting an occupant in the vehicle, activate a warning produced by the vehicle.

10. The vehicle of claim 9, wherein the warning includes at least one of activating a horn in a short burst pattern, flashing lights of the vehicle, or activating hazard light of the vehicle.

11. The vehicle of claim 1, wherein the remote parking unit is to, when the target parking space is narrow, send a second notification to the mobile device.

12. A method to remotely park a vehicle comprising:
    determining, with range detection sensors, whether a target parking space is narrow;
    in response to a request from a mobile device external to the vehicle:
    when the target parking space is narrow:
    scanning, with occupant detection sensors, an interior of the vehicle; and
    in response to detecting no occupants in the vehicle, sending, via a processor, to the mobile device, a first notification indicating that the target parking space is narrow.

13. The method of claim 12, wherein the range detection sensors include at least one of a plurality of ultrasonic sensors, a RADAR, a LiDAR, an infrared sensors, or a camera.

14. The method of claim 12, wherein the occupant detection sensors include at least one of an ultrasonic sensor, a weight sensor, a camera, a heartbeat sensor, or an RFID reader.

15. The method of claim 12, wherein the target parking space is narrow when a width of the target parking space is less than a width of the vehicle with doors of the vehicle open to facilitate entering and exiting the vehicle.

16. The method of claim 12, including, when the target parking space is not narrow, determining a likelihood that the target parking space will become narrow.

17. The method of claim 16, including, when the target parking space is likely to become narrow, scanning, the with occupant detection sensors, the interior of the vehicle.

18. The method of claim 12, including, in response to detecting an occupant in the vehicle, activating a warning produced by the vehicle.

19. The method of claim 18, wherein activating the warning includes at least one of activating a horn in a short burst pattern, flashing lights of the vehicle, or activating hazard light of the vehicle.

20. The method of claim 12, including, when the target parking space is narrow, sending a second notification to the mobile device.

21. A tangible, non-transitory, computer-readable medium comprising instruction that, when executed, cause a vehicle to:
    determine, with range detection sensors, whether a target parking space is narrow;
    in response to a request from a mobile device external to the vehicle:
    when the target parking space is narrow;
    scan, with occupant detection sensors, an interior of the vehicle; and
    in response to detecting no occupants in the vehicle, send, to the mobile device, a first notification indicating that the target parking space is narrow.

* * * * *